Oct. 24, 1939.   O. A. OHLSSON   2,177,225
FUEL BURNER
Filed Sept. 22, 1936

O. A. Ohlsson
INVENTOR

By Glascock Downing & Seebold
Attys

Patented Oct. 24, 1939

2,177,225

UNITED STATES PATENT OFFICE 2,177,225

FUEL BURNER

Olof Axel Ohlsson, Stavsjobruk, Sweden

Application September 22, 1936, Serial No. 101,997
In Sweden May 29, 1936

2 Claims. (Cl. 158—1)

The present invention relates to apparatus for mixing liquid or gaseous fuels with air in a closed chamber wherein the mixture is partly combusted.

The principal feature of the invention includes apparatus wherein the combustion air is supplied to the closed chamber through at least one nozzle which is so arranged with respect to the gas outlet that a current of air and more or less of the burnt gases from the fuel are caused to move in one or more loops in the closed chamber so as to provide preliminary combustion of the fuel and air. The mixture is thus led back to the air inlet or in the neighborhood thereof so that the incompletely combusted mixture is mixed with fresh air before leaving the closed chamber whereby complete combustion takes place outside the closed chamber or in a complete combustion chamber adjacent the outlet.

The various objects and features of the invention will be readily understood by those skilled in the art upon consideration of the accompanying drawing and the following description wherein several exemplary embodiments of the invention are disclosed.

Figure 1:
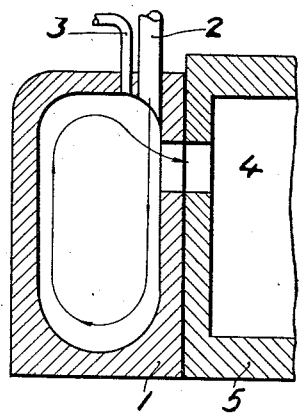
Fig. 1 is a sectional view of the preliminary combustion chamber showing the complete combustion chamber in section associated with the outlet thereof.

Referring to the drawing there is shown at 1 a closed preliminary combustion chamber which may be formed of cast iron, sheet metal or bricks. The inlet or nozzle for admitting a stream of air into the preliminary combustion chamber is indicated at 2 and the fuel is adapted to be introduced into the chamber by means of an inlet or pipe 3. The preliminary combustion chamber is provided with an outlet 4 so that the burning gaseous mixture may pass into the complete combustion chamber 5. The movement of the air and fuel mixture through the preliminary combustion chamber is indicated by the arrows in Figure 1. It will be noted that the fuel inlet 3 is arranged adjacent the air inlet or nozzle 2 and that the mixture of air and fuel is thus projected against the arcuate shaped wall opposite the fuel and air inlets. The mixture thus moves in the closed chamber 1 and passes across the air nozzle 2 before escaping through the outlet 4. Thus additional air is supplied to the mixture before escape thereof into the complete combustion chamber 5.

Figure 2:
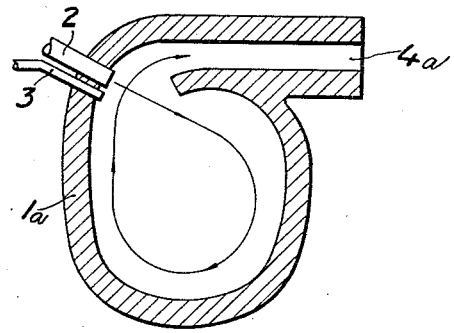
Fig. 2 is a sectional view of the modified preliminary combustion chamber.

The closed combustion chamber 1a shown in Figure 2 is provided with an air inlet or nozzle 2 and a fuel pipe or inlet 3 so that a mixture of these elements is projected against the curved inner wall of the preliminary combustion chamber. The mixture is thus whirled within the chamber 1a as indicated by the arrows in Figure 2 and the mixture also passes adjacent the air nozzle 2 so that additional air is supplied to the mixture before the escape thereof through the nozzle of the outlet 4a. The complete combustion chamber 5 of Figure 1 may also be associated with the outlet 4a of the apparatus shown in Figure 2.

By supplying the combustion air in such a manner in relation to the outlet the incompletely burnt mixture is caused to move in a circuitous path in the closed chamber back to the air inlet or in the neighborhood thereof so that the fuel and air are well mixed within the closed chamber and additional air is supplied thereto before the mixture passes through the outlet so that complete combustion is effected outside the closed chamber or within the complete combustion chamber 5. By simple control of the supply of air the combustion may be effected in such a manner that there is no excess of air in the completely burnt mixture.

While the invention has been described with reference to specific structural details, it is apparent that modifications may be made therein by those skilled in the art and such changes may be made without departing from the spirit and scope of the invention as set forth in the appended claims.

I claim:

1. In apparatus for burning liquid or gaseous fuels, a closed chamber having a fuel inlet through which the fuel may be passed into the chamber for partial combustion therein, said chamber having an inlet for admitting a stream of air into the chamber in a direction substantially parallel to the direction in which the fuel passes into the chamber, a portion of the inner surface of the chamber being arcuate shaped and the arcuate portion being arranged in the path of the air stream entering the chamber through the second mentioned inlet whereby the air stream is turned in the chamber so that the air is mixed with the fuel received in the chamber through the fuel inlet, said chamber having an outlet for permitting the partially combusted mixture of air and fuel to escape from the chamber, said outlet being so arranged with respect to the arcuate shaped portion of the chamber and the air inlet that the fuel and air mixture crosses the air stream before escaping through the outlet, and a combustion chamber for receiving the partially combusted mixture escaping through the outlet.

2. In apparatus for burning liquid or gaseous fuels, a closed partial combustion chamber having the inner surface thereof arcuate shaped to provide a substantially circular shaped chamber when viewed in section, said chamber having an inlet for admitting fuel to the chamber, said chamber having a separate air inlet for directing a stream of air into the chamber in a direction substantially parallel to the axis of the fuel inlet whereby the arcuate shaped inner surface causes the air stream to move in a circular path within the chamber and to be thoroughly mixed with the fuel, said chamber having an outlet and said outlet being arranged adjacent the air inlet and in such a manner with respect to the arcuate shaped inner surface of the chamber that the partially combusted mixture moving in a curved path crosses the air stream entering the second inlet adjacent the inner surface of the chamber immediately before escaping through the outlet, and a combustion chamber for receiving the partially combusted mixture passing through the outlet.

OLOF AXEL OHLSSON.